Jan. 28, 1958     H. ASTON     2,821,376
SPRING BALANCES
Filed April 19, 1954     3 Sheets-Sheet 1
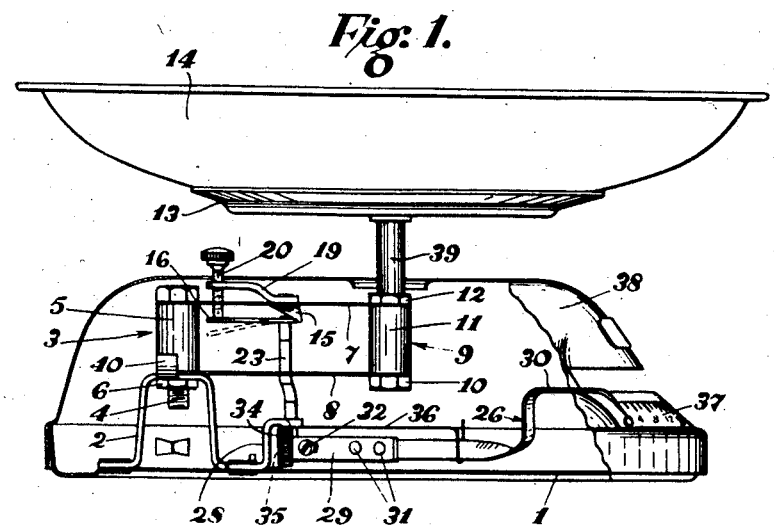
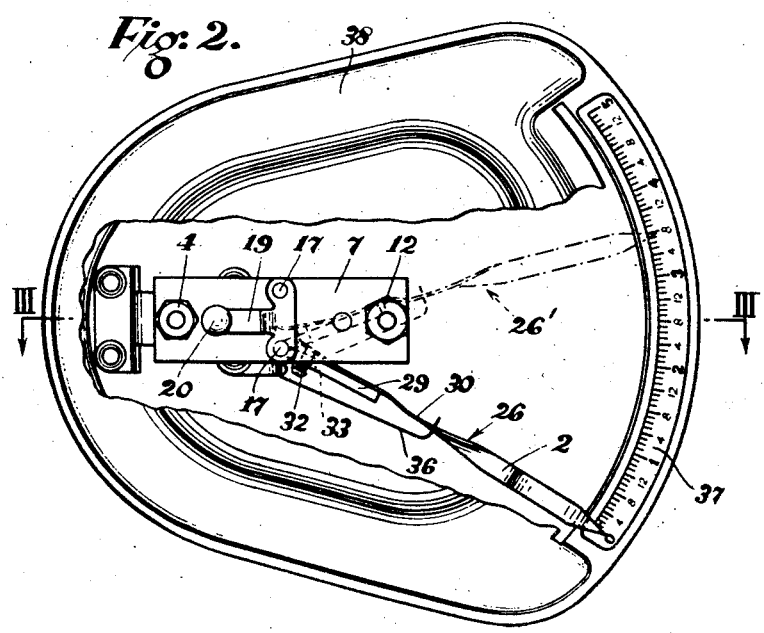
Inventor
HORACE ASTON
By
Richards v Geier
Attorney Jan. 28, 1958     H. ASTON     2,821,376
SPRING BALANCES Filed April 19, 1954     3 Sheets—Sheet 3

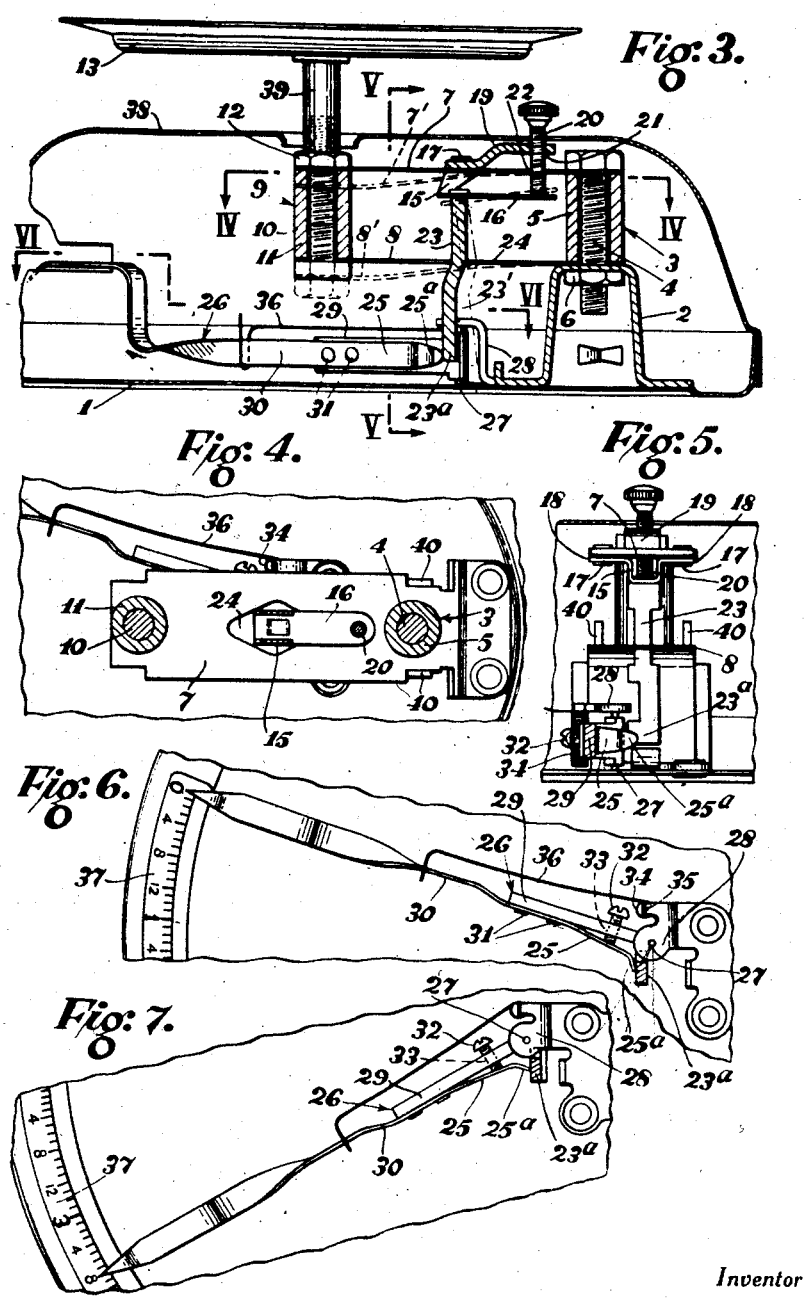

Inventor
HORACE ASTON

By
Richards & Geier
Attorneys

United States Patent Office 2,821,376
Patented Jan. 28, 1958

2,821,376

SPRING BALANCES

Horace Aston, West Bromwich, England, assignor to George Salter & Co. Limited, West Bromwich, England, a British company Application April 19, 1954, Serial No. 424,190

Claims priority, application Great Britain June 26, 1953

8 Claims. (Cl. 265—68)

This invention relates to spring balances of that kind having a load-supporting part with a vertically-movable member connected to a relatively fixed part by parallel-motion members, downward movement of the load-supporting part being transmitted to a pivoted indicator, such as a pointer or dial.

The object of the present invention is to provide a spring balance, of the above, which is of a novel and simple construction and which is inexpensive to manufacture.

According to the invention, in a spring balance, of the kind referred to, the movement of the load-supporting part is transmitted to the pivoted indicator by a part which is carried or controlled by one of the parallel-motion members in such a manner that it is caused to be tilted by the load, such tilting movement being arranged to control the movement of the indicator. The part which is caused to be tilted may have one end carried by one of the parallel-motion members and have its other and outer end directly engaged with the pivoted indicator, or with a member thereon, the tiltable part being so disposed relatively to the indicator that when the said part is tilted the displacement of its outer end causes or allows the indicator to turn. The parallel-motion members may comprise a pair of load-resisting blade springs disposed one above the other.

The pivoted indicator may comprise a pointer having an offset projection operatively engaged at its outer end by the displaceable end of the tiltable part, the said outer end of the offset projection being adjustably movable relatively to the pivotal axis of the pointer, whereby the leverage obtained may be varied.

Means may be provided for adjustably varying the inclination of the tiltable part relatively to the parallel-motion member which carries or controls it, in order that a taring adjustment of the pointer can be made; or a taring adjustment may be provided for by mounting the indicator on a pivot which is bodily movable relatively to the tiltable part.

Figure 1 of the accompanying drawings is a side view, partly in vertical section, of a spring balance constructed in accordance with the present invention, and having a load-supporting pan, downward movement of the pan being transmitted to a pointer.

Figure 2 is a plan of the lower part of the spring balance shown in Figure 1, but with an outer casing partly broken away.

Figure 3 is a vertical section, on a larger scale, on the line III—III, Figure 2, with a pan-supporting platform in place.

Figure 4 is a horizontal section on the line IV—IV, Figure 3.

Figure 5 is a vertical section on the line V—V, Figure 3.

Figure 6 is a section on the line VI—VI, Figure 3, the pointer being in a position corresponding to that shown in full lines in Figure 2.

Figure 7 is a section similar to Figure 6, but showing the pointer in a position corresponding to that shown in broken lines in Figure 2.

Figure 8:
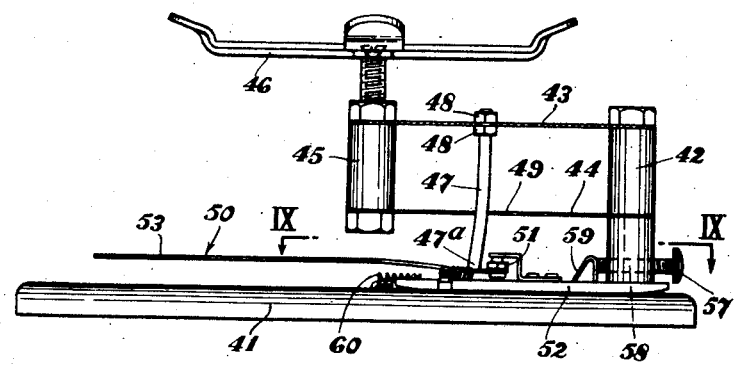
Figure 8 is a side elevation, partly in section, of the mechanism of a modified balance constructed in accordance with the invention.

Referring to Figures 1 to 7 of the drawings, a spring balance comprises a flat metal base part 1 having fixed to its top face, near one edge, an upstanding member 2 of inverted U-shape, the said member 2 carrying a fixed vertical post 3 which consists of a bolt 4 on which is mounted a sleeve 5, the bolt being secured in place by a nut 6. Propecting laterally in cantilever fashion from this fixed post 3 are a pair of parallel-motion blade springs 7, 8, disposed one above the other and held against lateral shifting by lugs 40 on member 2. The outer ends of these blade springs 7, 8, lie over the middle of the base part 1 and carry, and are connected by, a vertical end member 9 which consists of a bolt 10 on which is mounted a sleeve 11. The sleeves 5, 11, serve to space the blade springs 7, 8, from each other, and the said springs are kept clamped against the ends of the sleeves by the nut 6 on the bolt 4, and by a nut 12 on the bolt 10. The upper end of the bolt 10 of the end member 9 carries a circular sheet-metal platform 13 which serves as a support for a removable pan 14 for receiving the article or goods to be weighed, the said platform 13 having a depending threaded sleeve 39 which engages over the said upper end of the bolt 10. The blade springs 7, 8, serve as load-resisting springs, and when a load is placed in the pan 14 the springs 7, 8, flex to an extent which depends upon the load, and the end member 9 moves vertically downwards, being constrained by the blades 7, 8, to have a parallel motion relatively to the fixed post 3.

The upper blade spring 7 carries at its middle a depending transverse U-member 15 the base of which has an integral extension in the form of a spring tongue 16 which is spaced below the blade 7 and which points towards the fixed post 3. The U-member 15 is attached to the blade 7 by rivets 17 passed through lateral lugs 18 (Figure 5) on the said member 15, and these rivets 17 also serve to secure to the blade 7 a crank bracket 19 mounted on the upper face of the said blade and carrying a vertical screw 20 bearing on the outer end of the tongue 16, the said screw 20 being engaged with a tapped hole 21 in the bracket 19 and passing through a hole 22 in the blade 7.

The spring tongue 16 carries, near the U-member 15, a depending metal bar 23 having its upper end firmly secured to the said tongue 16 by riveting. The said bar 23 passes unobstructed through a slot 24 in the lower spring blade 8, and the lower and outer end, shown at 23ª, of the bar 23 engages an offset projecting 25 on a pointer 26 which can turn about the axis of a vertical pivot pin 27 journalled in the base 1, the upper end of the pivot pin being supported by a bracket 28. The pointer 26 comprises an arm 29 which carries the pivot pin 27 and to which a strip 30 of resilient metal is secured by rivets 31. This metal strip 30 constitutes the outer end of the pointer 26, and the said strip 30 has its inner portion extended beyond the rivets 31 to provide the offset projection 25, the said projection 25 being in the form of a spring leaf which diverges from the arm 29 in the direction of the bar 23, the outer end of the said projection or leaf 25, which end engages the end 23ª of the bar 23, being bent laterally as shown at 25ª. The arm 29 carries a screw 32 which is engaged with a tapped hole 33 in the said arm and which bears on the projection or leaf 25. A light coiled torsion spring 34 acts on the pointer 26 to keep the projection or leaf 25 pressed against the end of the bar 23, the said spring 34 being located and carried by a depending lug 35 (Figure 1) on the bracket 28 and having an integral arm 36 hooked to the pointer 26. The pointer 26 moves over a scale 37; and the mechanism of the balance is housed in a sheet-metal casing 38.

The above-described arrangement is such that when a load is placed in the pan 14, the blade springs 7, 8, flex and the depending bar 23 carried by the blade 7 tilts in a vertical plane and in such a direction that its lower end 23$^a$ is displaced, relatively to the base 1, towards the fixed U-member 2. This displacement of the bar end 23$^a$ causes the pointer 26 to move angularly over the scale 37 in a counter-clockwise direction (as viewed from above) and to an extent corresponding to the weight of the load in the pan 14, the projection 25 on the pointer being kept pressed against the bar end 23$^a$ by the action of the spring 34, as stated, so that the projection 25, with the pointer, moves to follow up the movement of the bar end 23$^a$. If, for example, the load is such as to cause the blade springs 7, 8, to flex from their no-load positions (shown in full lines in Figure 3) to the positions 7$^1$, 8$^1$, shown in broken lines in Figure 3 the bar 23 will tilt into position 23$^1$ (Figure 3) and the pointer 26 will move into the position shown at 26$^1$ in Figure 2.

The screw 20 carried by the blade 7 serves as an adjusting screw by means of which a taring adjustment may be made when the load to be weighed is placed in a container stood in the pan. The said screw 20 bears on the spring tongue 16, as stated, and this screw 20 can be turned to flex the tongue 16 downwards (such as into the position shown in broken lines in Figure 1) and thus cause the bar 23 to tilt relatively to the blade 7 and in such a direction that the bar end 23$^a$ moves away from the fixed member 2 and causes the pointer 26 to move in a clockwise direction. When a taring adjustment is to be made, the container is first stood empty on the pan 14, so that the pointer 26 moves over the scale to give a reading. The screw 20 is then turned, with the container still in the pan, so as to flex the tongue 16 downwards, to tilt the bar 23 sufficiently (relatively to the blade 7) to bring the pointer 26 back to its original zero position. If the container is now filled, the scale reading will give directly the weight of the contents of the container. When the container has been removed, the adjusting screw 20 can be turned to reset the pointer 26 to its zero position.

The screw 32 carried by the arm 29 of the pointer serves as an adjusting screw for enabling an adjustment for range to be made, that is to say, for enabling the balance to be adjusted by the manufacturer so as to ensure that a given load causes the deflection of the pointer through a predetermined angle, thus compensating for small deviations in the strength of the blade springs from a standard value, such as may occur when the balance is in production. The said screw 32 can be turned to flex the offset projection or leaf 25 and to vary the inclination of the latter relatively to the arm 29, and if the screw 32 is advanced, the end 25$^a$ of the projection or leaf 25 moves away from the axis of the pivot 27 and the leverage obtained is lessened, that is, the pointer moves through a smaller distance for a given load. If, on the other hand, the screw 32 is retracted, the end 25$^a$ moves towards the axis of the pivot 27, and the leverage obtained is increased. An adjustment for range can thus be made by turning the screw 32 sufficiently in the appropriate direction.

The blades 7, 8, are prevented from turning about the bolt 4 by stop lugs 40 engaging the blade 8.

Figure 9:
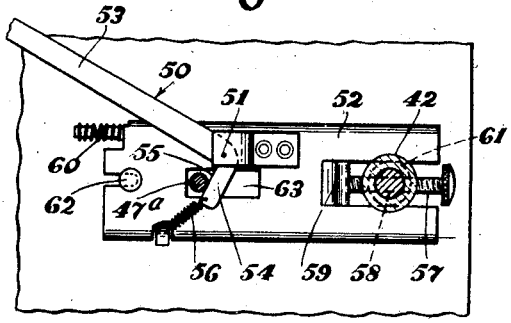
Figure 9 is a horizontal section on the line IX—IX, Figure 8.
Figure 10:
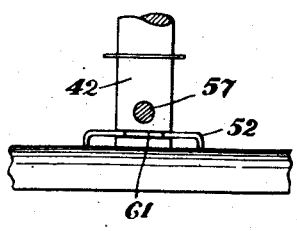
Figure 10 is a fragmentary end view of the said mechanism.

Referring to Figures 8 to 10 of the drawings, which show a modified mechanism, a spring balance comprises a base 41 provided with a fixed vertical post 42 from which project a pair of parallel-motion cantilever blade springs 43, 44, disposed one above the other, the outer ends of the said blades carrying, and being connected by, a vertical end member 45 carrying a pan-receiving cradle 46 at its upper end.

The upper blade spring 43 carries at its middle a depending rod 47 which is firmly secured to the said spring by lock nuts 48, as shown, or by riveting or other convenient means. This rod 47 passes unobstructed through a slot 49 in the lower blade 44, and the lower end, shown at 47$^a$, of the rod engages a pointer 50 which is pivoted at 51 to a plate 52 slidably mounted on the base 41. The said pointer 50 is of bell-crank form, and has a longer arm 53 which serves as a weight-indicating arm movable over a suitable scale, and a shorter arm 54 having a side edge 55 which is kept engaged with the rod end 47$^a$ by a light tension spring 56 connected between the arm 54 and the slidable plate 52.

When a load is placed in a pan on the cradle 46, the blade springs 43, 44, flex and the rod 47 tilts so that its end 47$^a$, which is engaged by the arm 54, is displaced towards the fixed post 42, thereby causing the whole pointer 50 to turn angularly in a counter-clockwise direction (as viewed from above) so that its longer arm 53 moves over the scale to an extent depending upon the load in the pan.

The slidable plate 52 is movable by means of an adjusting screw 57 engaging a threaded hole 58 in the fixed post 42, the said screw 57 bearing on an upstanding bracket 59 on the plate 52. This bracket 59 is kept in engagement with the screw 57 by a light compression spring 60 at the opposite end of the plate 52. When the screw 57 is advanced, the plate 52, and the pointer pivot 51 thereon, move bodily away from the post 42, and relative to the rod end 47$^a$, so that the shorter arm 54 of the pointer 50 is constrained, by reason of its engagement with the rod end 47$^a$, to turn towards the post 42, so that the pointer 50 moves in a counter-clockwise direction. When, on the other hand, the screw 57 is retracted, the plate 52 is moved bodily by the spring 60 towards the post 42, so that the arm 54, which is kept in engagement with the rod end 47$^a$ by the spring 56, turns away from the post 42, so that the pointer 50 moves in a clockwise direction. This arrangement enables a taring adjustment to be made, and in order to make such an adjustment an empty container is stood on the pan to obtain a reading, and the screw 57 is retracted, with the container still in the pan, to bring the pointer 50 back to its zero position. The pointer can be re-set to zero, after the weighing of the container when filled, by advancing the screw 57.

The plate 52 is conveniently guided by an annular slot 61 in the post 42 and by a headed peg 62 on the base 41; and the said plate 52 has a slot 63 into which the rod end 47$^a$ depends when the springs 43, 44, flex under load, so that the plate does not obstruct the rod 47.

No rack and pinion mechanism, such as has hitherto been employed in balances of the kind referred to, is necessary in a balance constructed in accordance with the present invention, so that manufacturing costs are considerably reduced.

The invention can be applied to a balance having a pivoted dial, instead of a pointer, if required.

I claim:

1. A spring balance comprising a vertically-movable load-supporting part, a relatively-fixed part, parallel-motion upper and lower load-resisting blade springs connecting said load-supporting part to said relatively-fixed part, a pivoted pointer, an offset spring leaf carried by and projecting from said pointer, a screw carried by said pointer, said screw being provided for adjustably flexing the spring leaf to move the outer end thereof relatively to the pivotal axis of the pointer, and means for transmitting the downward movement of the load-supporting part to the pivoted pointer, said movement-transmitting means comprising a part which is carried at its upper end by the upper blade spring in such a manner that it is caused to be tilted by the load and which is directly and operatively engaged at its other and lower end with the outer end of the spring leaf on the pointer, said tiltable part depending through an aperture in the lower blade spring and being so disposed relatively to the pointer that when the said tiltable part is tilted the displacement of its lower end controls the movement of the pointer, and movement of the outer end of the spring leaf relatively to the pivotal axis of the pointer causing the leverage obtained to be varied.

2. A spring balance comprising a vertically-movable load-supporting part, a relatively-fixed part, parallel-motion load-resisting blade springs connecting said load-supporting part to said relatively-fixed part, a spring tongue carried at one end by one of the parallel-motion blade springs, a screw carried by said tongue-carrying blade spring, said screw being adapted adjustably to flex said spring tongue, a pivoted pointer, an offset spring leaf projecting from said pointer, a screw carried by said pointer, said screw being provided for adjustably flexing the spring leaf to move the outer end thereof relatively to the pivotal axis of the pointer, and means for transmitting downward movement of the load-supporting part to the pivoted pointer, said movement-transmitting means comprising a part which is carried at one end by the tongue-carrying blade spring in such a way that it is caused to be tilted by the load and which is directly and operatively engaged at its other and outer end with the outer end of the spring leaf on the pointer, said tiltable part being so dispersed relatively to the pointer that when the said tiltable part is tilted the displacement of its outer end controls the movement of the pointer, the spring tongue serving to connect said tiltable part to said blade spring whereby the inclination of the tiltable part can be varied by flexing the tongue so that a taring adjustment of the pivoted pointer can be made, and movement of the outer end of the spring leaf relatively to the pivotal axis of the pointer causing the leverage obtained to be varied.

3. A spring balance comprising a vertically-movable load-supporting part, a relatively-fixed part, parallel-motion upper and lower load-resisting blade springs connecting said load-supporting part to said relatively-fixed part, a spring tongue carried at one end by the upper blade spring, a screw carried by said upper blade spring, said screw being adapted adjustably to flex said spring tongue, a pivoted pointer, an offset spring leaf carried by and projecting from said pointer, a screw carried by said pointer, said screw being provided for adjustably flexing the spring leaf to move the outer end thereof relatively to the pivotal axis of the pointer, means for transmitting downward movement of the load-supporting part to the pivoted pointer, said movement-transmitting means comprising a bar which is carried at its upper end by the upper blade spring in such a way that it is caused to be tilted by the load and which is directly and operatively engaged at its lower end with the outer end of the spring leaf on the pointer, and a spring acting on said pointer to keep the outer end of the spring leaf pressed against the lower end of the tiltable bar, said bar depending through an aperture in the lower blade spring and being so disposed relatively to the pointer that when the said tiltable bar is tilted the displacement of its lower end causes the pointer to turn, the spring tongue serving to connect the tiltable bar to the upper blade spring whereby the inclination of the titltable bar can be varied by flexing the tongue so that a taring adjustment of the pointer can be made, and movement of the outer end of the spring leaf relatively to the pivotal axis of the pointer causing the leverage obtained to be varied.

4. A spring balance comprising a vertically-movable load-supporting part, a relatively-fixed part, upper and lower parallel-motion load-resisting spring blades connecting said load-supporting part to said relatively-fixed part, a base, a member slidably mounted on said base, a pointer of bell-crank form pivoted to and carried by said slidable member, said pointer having a longer arm and a shorter arm, said longer arm serving as an indicating arm, means for transmitting downward movement of the load-supporting part to the pointer, said movement-transmitting means comprising a part which is carried at its upper end by the upper spring blade in such a way that it is caused to be tilted by the load and which is directly and operatively engaged at its lower end with an edge of the shorter arm of the pointer, said tiltable part depending through an aperture in the lower spring blade and being so disposed relatively to the pointer that when the said tiltable part is tilted by the load its lower end acts to turn the pointer, and screw means for moving the pointer-carrying slidable member bodily relatively to the tiltable part in order that a taring adjustment can be made.

5. A spring balance comprising a vertically movable load supporting part; a relatively fixed part; parallel motion load resisting members connecting said load supporting part to said relatively fixed part; a pivoted pointer; an offset leaf spring carried by and projecting from said pointer; a screw carried by said pointer; said screw being provided for adjutably flexing the leaf spring to move the outer end thereof relatively to the pivotal axis of the pointer; and means for transmitting the downward movement of the load supporting part to the pivoted pointer, said movement transmitting means comprising a part which is carried at its upper end by one of the load resisting members in such a manner that it is caused to be tilted by the load, and which is directly and operatively engaged at its lower end with the outer end of the leaf spring on the pointer, said tiltable part being so disposed relatively to the pointer that when the said tiltable part is tilted the displacement of its lower end controls the movement of the pointer; and movement of the outer end of the leaf spring relatively to the pivotal axis of the pointer causing the leverage obtained to be varied.

6. A spring balance comprising a vertically movable load supporting part; a relatively fixed part; upper and lower parallel motion load resisting blade springs connecting said load supporting part to said relatively fixed part; a spring tongue carried at one end by the upper blade spring; a screw carried by said upper blade spring, said screw being adapted adjustably to flex said spring tongue, and said screw having an upwardly presented head disposed above said upper blade spring; a pivoted indicator; and means for transmitting downward movement of the load supporting part to the pivoted indicator, said movement transmitting means comprising a depending part which is carried at its upper end by the spring tongue in such a manner that it is caused to be tilted by the load, such tilting movement being arranged to control the movement of the indicator, said spring tongue serving to connect said tiltable part to said upper blade spring whereby the inclination of the tiltable part can be varied by flexing the tongue so that a taring adjustment of the pivoted indicator can be made.

7. A spring balance comprising a vertically movable load supporting part, a relatively fixed part, upper and lower parallel motion load resisting members connecting said load supporting part to said relatively fixed part, a base, a member slidably mounted on said base, a pointer of bell crank form pivoted to and carried by said slidable member, said pointer having a longer arm and a shorter arm, said longer arm serving as an indicating arm, means for transmitting downward movement of the load supporting part to the pointer, said movement transmitting means comprising a part which is carried at its upper end by one of the load resisting members in such a way that it is caused to be tilted by the load and which is directly and operatively engaged at its lower end with an edge of the shorter arm of the pointer, said tiltable part being so disposed relatively to the pointer that when the said tiltable part is tilted by the load its lower end acts to turn the pointer, and screw means for moving the pointer carrying slidable member bodily relatively to the tiltable part in order that a taring adjustment can be made.

8. A spring balance comprising a vertically-movable load supporting part; a relatively fixed part; parallel motion load resisting members connecting said load supporting part to said relatively fixed part; a pivoted indicator; and means for transmitting downward movement of the load supporting part to the pivoted indicator; said movement transmitting means comprising a part attached to and movable with one of the parallel motion members and projecting therefrom in a direction which intersects the plane of rotation of the pivoted indicator so that downward movement of the load causes tilting of the said part comprising the movement transmitting means in a plane intersecting the said plane of rotation, said tiltable part being directly and operatively engaged with, but not being positively connected to, a part of the pivoted indicator and being so disposed relatively to the said indicator that tilting of the tiltable part results in relative sliding movement, between the tiltable part and the part of the indicator with which it engages, in such a manner as to control the rotational movement of the indicator.

References Cited in the file of this patent

UNITED STATES PATENTS

| | | |
|---|---|---|
| 66,524 | Shaler | July 9, 1867 |
| 371,920 | Both | Oct. 25, 1887 |
| 642,321 | Gilfillan | Jan. 30, 1900 |
| 2,175,024 | Hansen | Oct. 3, 1939 |
| 2,613,927 | Demas | Oct. 14, 1952 |
| 2,681,222 | Stelzer | June 15, 1954 |
| 2,683,985 | Smulski | July 20, 1954 |

FOREIGN PATENTS

| | | |
|---|---|---|
| 99,316 | Switzerland | June 1, 1923 |
| 604,663 | Germany | Oct. 25, 1934 |
| 786,861 | France | June 17, 1935 |